(12) United States Patent
Ashton et al.

(10) Patent No.: US 9,027,611 B2
(45) Date of Patent: May 12, 2015

(54) MULTI-PURPOSE TIRE

(75) Inventors: Charles Joseph Ashton, Cuyahoga Falls, OH (US); Mark Leonard Bonko, Uniontiwn, OH (US); Robert Edgar Boore, Uniontown, OH (US); Michael Howard Curtis, Stow, OH (US); Max Harold Dixon, Kent, OH (US); Joshua Randall Elsass, Wadsworth, OH (US); John David Renner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1975 days.

(21) Appl. No.: 12/208,374

(22) Filed: Sep. 11, 2008

(65) Prior Publication Data

US 2010/0059157 A1  Mar. 11, 2010

(51) Int. Cl.
*B60C 11/11* (2006.01)
*B60C 11/03* (2006.01)

(52) U.S. Cl.
CPC ......... *B60C 11/11* (2013.01); *B60C 2011/0346* (2013.04); *B60C 2011/0337* (2013.04); *B60C 11/0311* (2013.04); *B60C 11/0332* (2013.04); *B60C 2200/14* (2013.04)

(58) Field of Classification Search
CPC ............................ B60C 11/0311; B60C 11/11
USPC ........ 152/209.1, 209.2, 209.3, 902; D12/512, D12/535, 536, 544, 564, 565, 571, 585–587, D12/579, 600–603, 900, 901
See application file for complete search history.

(56) References Cited

U.S. PATENT DOCUMENTS 4,545,415 A     10/1985  Lindner et al. ............ 152/209 R
7,048,022 B2 *  5/2006   Rooney et al. ........... 152/209.16
(Continued)

FOREIGN PATENT DOCUMENTS

CN      101239565       8/2008   ............ B60C 11/117
GB         460338    *  1/1937
(Continued)

OTHER PUBLICATIONS

European Search Report completed Nov. 25, 2009.
Chinese Search Report completed Nov. 18, 2010.

*Primary Examiner* — Steven D Maki
*Assistant Examiner* — Robert Dye
(74) *Attorney, Agent, or Firm* — Richard B. O'Planick (57) ABSTRACT

A tire has a circumferential tread, the tread including shoulder tread regions configured for off-road performance separated by and interlocking with a center tread region configured for on-road performance. The shoulder tread regions are defined by a repeating pattern of two or more distinct shoulder tread elements and the center tread region is defined by a repeating pattern of two or more distinct center tread elements. The shoulder tread elements each have a ground contacting surface area greater than a ground contacting surface area of the center tread elements. The center tread elements extend at a relatively greater angle of inclination with respect to an equatorial centerplane of the tire and the shoulder tread elements extend at a relatively lesser angle of inclination with respect to the centerplane. The center tread elements and the shoulder tread elements are irregular and asymmetrical about a longitudinal central axis and a transverse central axis and, together, total five or more (three in the center tread region and two in the shoulder tread region) tread blocks of mutually distinctive geometric shape.

20 Claims, 6 Drawing Sheets

(56) References Cited

U.S. PATENT DOCUMENTS

D544,829 S * 6/2007 Umstot ........................ D12/579
D556,673 S * 12/2007 Missik-Gaffney et al. .. D12/579
D601,947 S * 10/2009 Bonko et al. ................. D12/579

FOREIGN PATENT DOCUMENTS

| JP | 62-122804 | * | 6/1987 |
| JP | 2002-264614 | * | 9/2002 |

* cited by examiner

FIG-1

SEE FIG-4

MULTI-PURPOSE TIRE

FIELD OF THE INVENTION

The invention relates generally to a radial tire and, more specifically, to a tread pattern for a tire providing multi-purpose operational capability.

BACKGROUND OF THE INVENTION

Radial tires for vehicles are available incorporating a tread pattern suitable for the intended operational use expected of the vehicle. For example, a passenger car is typically outfitted with a tire providing requisite on-highway performance. Such performance will take into consideration desired traction, durability, and road noise levels for the intended application. Increasingly, tires are required to satisfy statutory performance issues such as an acceptable noise level. Because some vehicles, such as light trucks and utility vehicles are intended for multi-purpose operational use in a range of road conditions, achievement of a tire providing desired performance in such a range of applications while meeting acceptable noise constraints mandated by statute has proven problematic.

SUMMARY OF THE INVENTION

According to one aspect of the invention, a tire has a circumferential tread, the tread including shoulder tread regions configured for off-road performance separated by and interlocking with a center tread region configured for on-road performance. The shoulder tread regions are defined by a repeating pattern of two or more distinct shoulder tread elements and the center tread region is defined by a repeating pattern of two or more distinct center tread elements. The shoulder tread elements each have a ground contacting surface area greater than a ground contacting surface area of the center tread elements.

In another aspect(s) of the invention, the center tread elements extend at a relatively greater angle of inclination with respect to an equatorial centerplane of the tire and the shoulder tread elements extend at a relatively lesser angle of inclination with respect to the centerplane.

The shoulder and center tread elements interfit to define first and second zig-zag shaped circumferential grooves separating the center tread region from the shoulder tread regions and the center tread elements define a central zig-zag shaped circumferential groove generally along the equatorial centerplane of the tire.

In yet another aspect, the center tread elements and the shoulder tread elements are elongate, irregular and asymmetrical about a longitudinal axis and a transverse axis and, together, total five or more (three in the center tread region and two in the shoulder tread region) tread blocks of mutually distinct configuration.

DEFINITIONS

"Aspect ratio" of the tire means the ratio of its section height (SH) to its section width (SW) multiplied by 100% for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Referring to FIGS. 1, 2, 3, 5, 6, the subject invention relates generally to a tire 10 having a circumferential tread 12 that is defined generally by a center tread region 14 and opposite shoulder tread regions 16, 18. The shoulder regions 16, 18 interfit with the center region and are separated by the center region 14 by zigzag shaped circumferential shoulder grooves 42, 44. The center tread region 14 includes a circumferential spaced array of block elements 1, 2, and 3 in a prescribed pattern, each block element 1, 2, and 3 having a generally elongate distinctive shape relative to the other center block elements. More or fewer block elements of mutually differentiated shape may be used to construct the center tread region 14 if desired. Each of the shoulder tread regions 16, 18 includes a circumferential spaced array of alternating block elements 4 and 5, the block elements 4, 5 having a generally elongate angled mutually distinctive shape, adjacent block elements 4 and 5 having axially inward ends angling toward each other into close proximity. More block elements of mutually differentiated shape may be used to construct each shoulder tread region 16, 18 if desired.

From the referenced figures it will be noted that the five block elements 1-5 are mutually differentiated in shape from each other. As such, road noise is reduced and controlled to an acceptable level. The orientation, dimension, and shape of the center tread region array of block elements 1, 2, and 3 allow the tire 10 to meet on-road performance requirements while the orientation, dimension, and shape of the shoulder tread region array of block elements 4 and 5 allow the tire 10 to meet snow traction and off-road performance requirements as will be explained. The integration of the block elements 1-5 and their incorporation into region-specific portions of the tread 12 thus results in a tire 10 that meets performance criteria for both on-road and off-road use.

Figure 1:
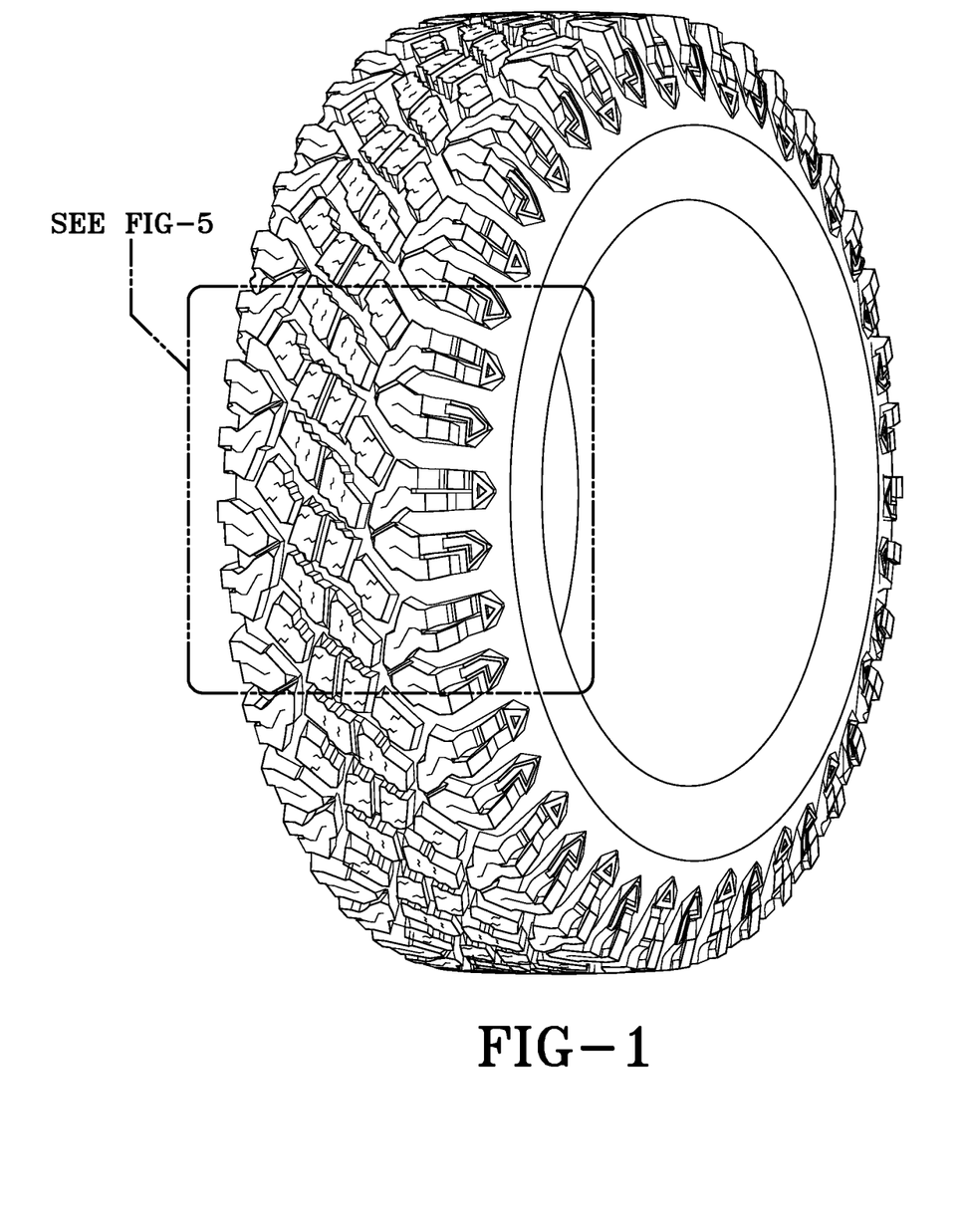
FIG. 1 is a perspective view of a tire tread embodying the invention.
Figure 2:
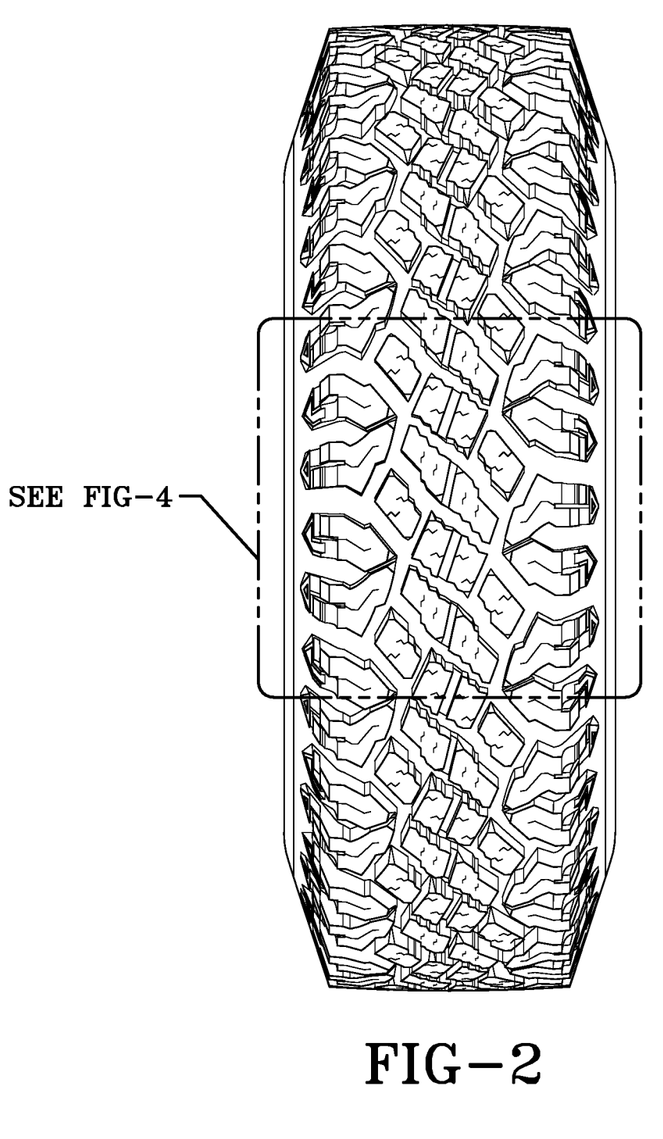
FIG. 2 is a front elevation view thereof.
Figure 3:
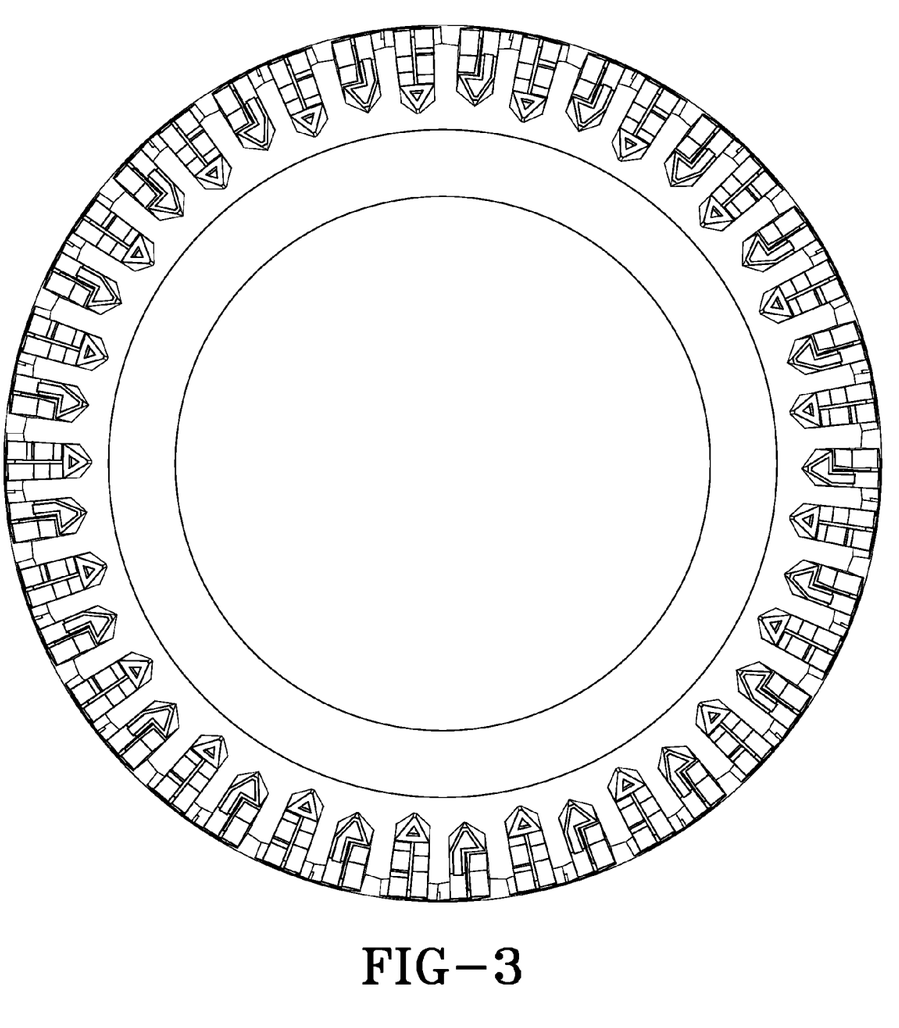
FIG. 3 is a side elevation view thereof.
Figure 4:
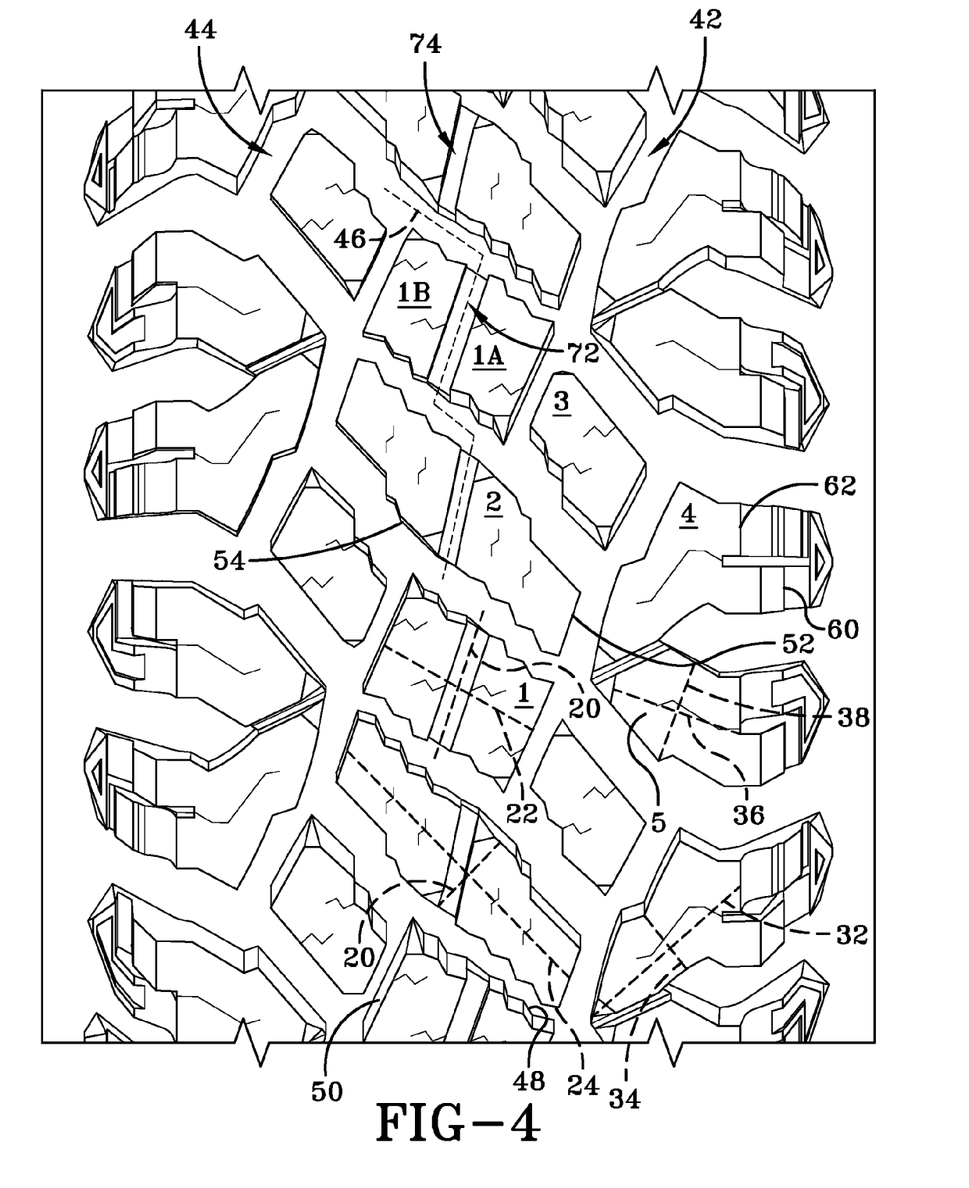
FIG. 4 is an enlarged front elevation view of a portion of the tread.
Figure 5:
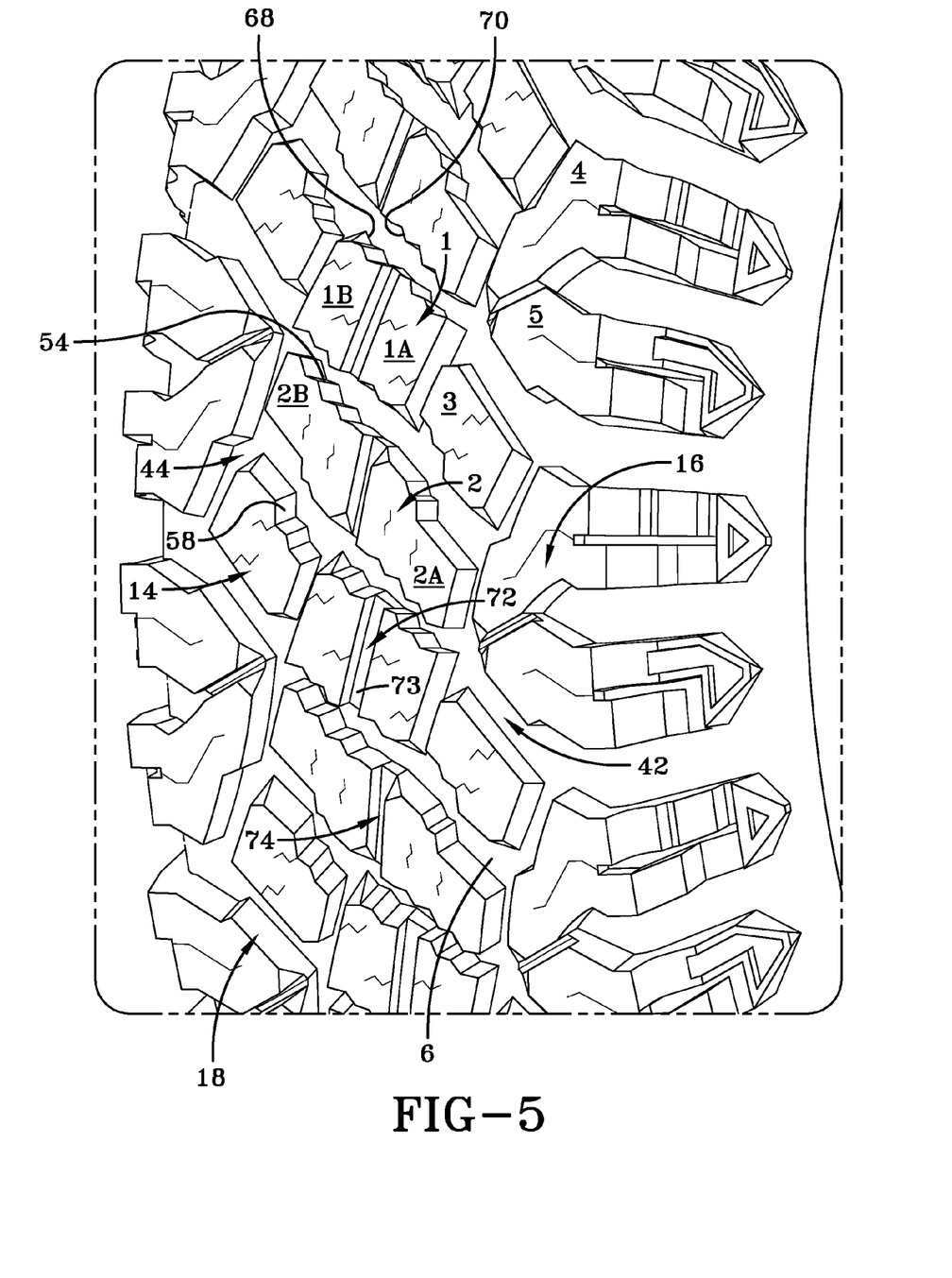
FIG. 5 is a perspective view of the tread portion of FIG. 4.
Figure 6:
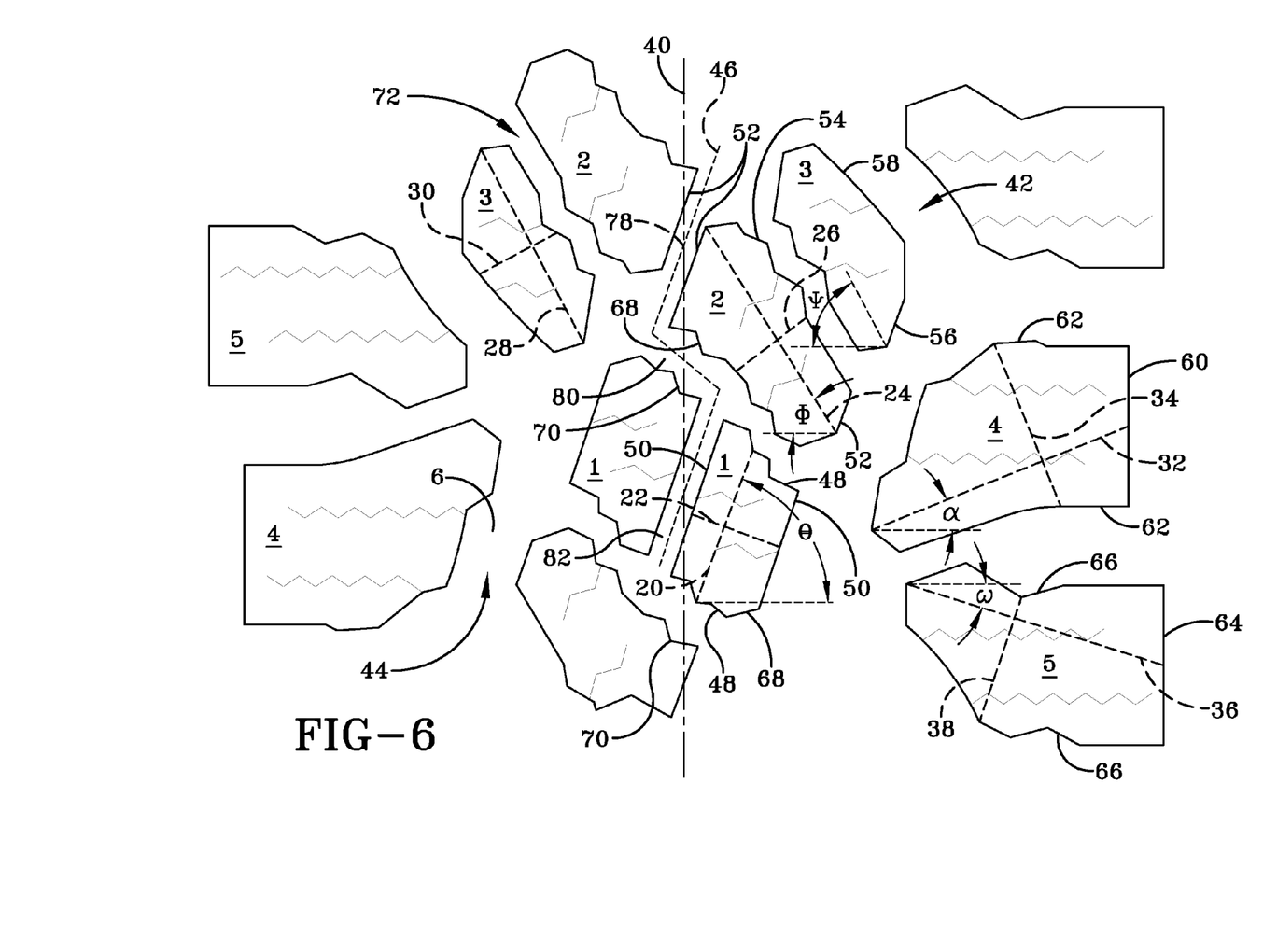
FIG. 6 is a layout of the tread showing surface areas and inclination angles and identification by numeral of the distinct blocks comprising the tread.

The circumferential array of the center tread region 14 is a repeating arrangement of the tread blocks 1, 2, and 3 as will be seen from FIGS. 2 and 7. The blocks 1 are positioned at a left to right incline, each block 1 having a bifurcating transverse groove 72 formed therein extending to a bottom groove floor 73 that is elevated above a bottom surface 6. A pair of oppositely inclining (right to left as shown) blocks 3 flank each block 1. A longer block 2 separates adjacent blocks 1 within the circumferential center tread array, the blocks 2 inclining in the direction of the blocks 3. Each block 2 has a bifurcating transverse groove 74 formed therein extending to a bottom groove floor 75 that is elevated above the tread tire surface 6.

Each of the blocks 1-5 are generally irregular in shape and mutually differentiated in configuration. Portions 1A and 1B of the block 1 on opposite sides of the bifurcating grove 72 are elongate, each having a longitudinal axis 20 extending between midpoints of irregular jagged ends 48 and a transverse axis 22 extending between midpoints of block portion straight sides 50. The block portions 1A and 1B are asymmetrical with respect to the respective axis 20 and the axis 22. The jagged ends 48, oriented along the center plane of the tire, provide enhanced traction in the tire. The blocks 1 within the circumferential center tread region 14 array incline in the direction shown in FIGS. 2 and 7 at an inclination angle θ that lies preferably within a range of 55-75 degrees measured between the axial direction of the tire and the longitudinal axis 20. The area of each block 1 is comparatively small, preferably but not exclusively limited to 560 mm². The blocks 1 are spaced along the circumferential array comprising tread 12, with block portions 1A and 1B having opposed straight sides 50 defining bifurcation groove 72 at the inclination angle θ.

Blocks 2 are irregular in shape and alternate with blocks 1 within the circumferential tread array 12. The blocks 2 each comprise block end portions 2A and 2B separated by the bifurcation grove 74. Each block portion 2A and 2B had a longitudinal axis 24 extending between furthermost extending apexes of angular block portion ends 52 and a tranverse axis 26 extending between irregular jagged sides 54. The block portions 2A and 2B are asymmetrical with respect to their respective axis 24 and axis 26. The block portions 2A and 2B within the circumferential center tread region 14 array incline in the direction shown in FIGS. 2 and 7 at an inclination angle φ within a preferred range of 55-75 degrees as measured between the axial direction of the tire and the longitudinal axis 24 of each block portion. The road contacting surface area of each block 2 is comparatively small to shoulder block elements, such as but not limited to 933 mm². The notched irregular sides 54 of each block portion 2A and 2B, oriented along the circumferential centerplane of the tire, provide jagged edges for enhanced traction performance by the tire. The notched leading and trailing side surfaces 54 of blocks 2 and the notched ends 48 of blocks 1 are complementarily notched having opposite protrusions 68 and recesses 70 identified on the surfaces 54, 48. Notched surfaces 54 and 48, oriented within the center tread region 14 along the centerplane of the tire, thus face the direction of tire travel for enhanced traction of the tire against a road surface. The complementary size, shape, and location of protrusions 68 relative to opposite recesses 70 within in the surfaces 54, 48 enhance traction while the overall shape of blocks 1 and 2 are differentiated so as to effect noise reduction in the tire.

The third differently shaped block element 3 within the center tread region 14 is irregular in shape and disposed on opposite sides of the block elements 2 along the circumferential tread array 12. The blocks 3 are elongate and have a longitudinal axis 28 extending between furthermost extending pointed block ends 56 and a transverse axis 30 extending between irregular jagged sides 54. The blocks 3 are asymmetrical with respect to the axis 28 and axis 30. The blocks 3 within the circumferential center tread region 14 array incline generally parallel with the blocks 2 as shown in FIGS. 2 and 7 at an inclination angle ψ within a preferred range of 55-75 degrees as measured between the axial direction of the tire and the longitudinal axis 28. The road contacting surface area of each block 3 is comparatively small to the shoulder block elements, such as but not limited to 697 mm². Blocks 3 are paired on opposite sides of each of the blocks 2. The notched and irregular sides 58 of each block 3, oriented along the circumferential centerplane of the tire, provide jagged edges for enhanced traction performance by the tire. The side surfaces 58 of blocks 3 and side surfaces 54 of blocks 2 are complementarily notched having opposite protrusions 68 and recesses 70. Notched surfaces 54 and 48, oriented within the center tread region 14 along the centerplane of the tire, face the direction of tire travel for enhanced traction of the tire against a road surface. The complementary size, shape, and location of protrusions 68 relative to opposite recesses 70 within in the surfaces 54, 48 enhance traction while the overall shape of blocks 1 and 2 are differentiated so as to effect noise reduction in the tire.

Differently shaped block elements 4, 5 are alternatively disposed in a circumferential array within each of the shoulder tread regions 16, 18. Each block element 4, 5, is generally larger than the block elements 1, 2, and 3 of the center tread region 14. The block elements 4, 5 are irregular in shape, elongate and have a longitudinal axis 32, 36, respectively extending between furthermost axially inward extending pointed end and a straight axially outward ends 60, 64 at the edge of the tread 12. The block elements further have a transverse axis 34, 38, respectively extending between respective irregular jagged sides 62, 66. The blocks 4, 5 are asymmetrical with respect to their respective axis 32, 34 and axis 36, 38. The blocks 4, 5 within the shoulder regions 16, 18 incline at respective angles that are smaller than the angle of inclination in the center tread region blocks. Blocks 4, extend at respective inclination angles $\alpha$, $\omega$ within a preferred range of 10-25 degrees to the axial direction of the tire as shown in FIG. 7, the angles $\alpha$, $\omega$ being of preferred respective magnitudes of 22 and 18 degrees. The road contacting surface area of each block 4, 5 is comparatively large to the center tread block elements, such as but not limited to 1715 mm$^2$ for block element 4 and 1566 mm$^2$ for block element 5. The notched irregular side surfaces 62 and 66 of each block 4, 5, oriented at a small inclination angle in a circumferential array, provide jagged edges for enhanced traction performance by the tire in off-road conditions. Notched surfaces 62 and 66 face the direction of tire travel for enhanced traction of the tire under off-road driving conditions. The relatively large size of the blocks 4, 5 coupled with the jagged leading edges 62, 66 enhance traction of the tire while the overall shape of blocks 4 and 5 are differentiated between each other and the center tread block elements so as to effect noise reduction in the tire.

From FIG. 7, it will be apparent that the five distinctively shaped blocks 1-5 create a tread array that defines a zigzag shaped groove 42, 44 separating each tread shoulder region 14, 16 from the center tread region 14. In addition, a zigzag shaped circumferential pathway 46 is defined about the centerplane of the tread 12 comprising pathway portions along bifurcating grooves 78 of the blocks 2; portions of surface 6 separating blocks 1 and 2; and bifurcating grooves 72 of the blocks 1. The shoulder tread regions 16, 18 will be seen to from FIGS. 1-5 to interlock, or interfit, into the center tread region. That is, the shoulder tread region blocks 4, 5 project axially inward into the central part of the tread 12 while the center tread block array projects axially outward into the shoulder regions. Together the center tread blocks and the shoulder tread blocks interfit to form the zigzag shaped shoulder grooves 44, 46. The interfitting or interlocking of the shoulder block arrays with the center block arrays, coupled with the more highly angled or inclined center block elements 1, 2, 3 relative to the shoulder block elements 4, 5, operates to easily dissipate material such as snow or water from the center tread region 14 to the shoulder tread regions 16, 18 and also helps reduce noise and vibration in the tire.

The subject tread 12 thus provides a block array that interfits differently configured shoulder blocks 4, 5 with differently configured center blocks 1, 2, and 3 to reduce noise generation. Each of the blocks 1-5 are differently shaped and irregular, providing jagged edges for traction and differentiated form for noise reduction. The angles of inclination of the center tread elements 1, 2, and 3 are greater than the angles of inclination of the shoulder block elements 4, 5 to efficiently evacuate material to the side of the tread. The surface areas of the center tread blocks 1-3 are less than the surface areas of the shoulder blocks 4, whereby the center tread region 14 facilitates good on-road performance by the tire while the shoulder tread regions 16, 18 facilitate good off-road performance. Smaller center blocks interlocked or interfitted with larger shoulder blocks results in a tire suitable for multi-purpose operational use under a range of road conditions while meeting acceptable noise constraints.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having a circumferential tread, the tread comprising shoulder tread regions separated by and interlocking with a center tread region, the shoulder tread regions each comprising a repeating pattern of at least two distinct shoulder tread elements and the center tread region comprising a repeating alternating circumferential pattern of at least two distinct center tread elements, a first elongate center tread element of the two center tread elements inclining longitudinally toward a first shoulder tread region and having inclining irregular jagged opposite ends facing in a circumferential direction, and a second elongate center tread element of the two center tread elements inclining longitudinally toward a second shoulder tread region opposite the first shoulder tread region, and the second center tread element further having inclining irregular and jagged opposite longitudinal sides facing in a circumferential direction; and wherein the shoulder tread elements each have a ground contacting surface area greater than a ground contacting surface area of the center tread elements.

2. A tire according to claim 1, wherein the center tread elements extend at an angle of inclination within a range of 55-75 degrees with respect to an axial direction of the tire.

3. A tire according to claim 2, wherein alternating tread elements in the center tread region repeating pattern incline toward opposite shoulder tread regions and each tread element has a bisecting inclined channel defined by inclined bisecting channel edges, each bisecting inclined channel having a reduced depth with respect to a height of a respective center tread element into which the channel extends.

4. A tire according to claim 2, wherein the shoulder tread elements extend at an angle of inclination within a range of 10-25 degrees with respect to the axial direction of the tire.

5. A tire according to claim 1, wherein the shoulder and center tread elements interfit to define first and second zigzag shaped circumferential grooves separating the center tread region from the shoulder tread regions.

6. A tire according to claim 5, wherein the center tread elements define a central zigzag shaped circumferential pathway substantially following on the equatorial centerplane of the tire.

7. A tire according to claim 6, wherein the first and second zigzag shaped grooves and the center pathway have irregular sides.

8. A tire according to claim 1, wherein the at least two distinct center tread elements are intersected by an equatorial centerplane of the tire tread and are alternatively disposed in a repeating circumferential pattern forming the center tread region.

9. A tire according to claim 8, wherein the pairs of distinct center tread elements incline in the longitudinal direction at respective inclination angles toward opposite respective shoulder tread regions.

10. A tire according to claim 9, wherein the center tread elements extend at an angle of inclination within a range of 55-75 degrees with respect to an axial tire direction.

11. A tire according to claim 10, wherein the shoulder tread elements extend at an angle of inclination within a range of 10-25 degrees with respect to the axial direction of the tire.

12. A tire according to claim 11, wherein the shoulder and center tread elements interfit to define first and second zigzag shaped circumferential grooves separating the center tread region from the shoulder tread regions.

13. A tire according to claim 12, wherein the center tread elements define a central zigzag shaped circumferential pathway substantially following the equatorial centerplane of the tire.

14. A tire according to claim 1, wherein the center tread elements and the shoulder tread elements are mutually distinct in size and configuration and each is irregular and asymmetrical about a longitudinal axis and a transverse axis.

15. A tire having a circumferential tread, the tread comprising shoulder tread regions separated by a center tread region, the shoulder tread regions each comprising a repeating pattern of at least two distinct shoulder tread elements and the center tread region comprising a repeating alternating pattern of at least two distinct center tread elements, a first elongate center tread element of the two center tread elements inclining longitudinally toward a first shoulder tread region and having inclining irregular jagged opposite ends facing in a circumferential direction, and a second elongate center tread element of the two center tread elements inclining longitudinally toward a second shoulder tread region opposite the first shoulder tread region, and the second center tread element further having inclining irregular and jagged opposite longitudinal sides facing in a circumferential direction.

16. A tire according to claim 15, wherein at least one of the inclining irregular and jagged ends and sides of respective center tread elements are intersected by an equatorial centerplane of the tire.

17. A tire according to claim 16, wherein the shoulder and center tread elements interfit to define first and second zigzag shaped circumferential grooves separating the center tread region from the shoulder tread regions.

18. A tire according to claim 17, wherein the center tread elements define a central zigzag shaped circumferential pathway substantially following an equatorial centerplane of the tire.

19. A tire according to claim 15, wherein the center tread elements and shoulder tread elements incline with respect to a tire axial direction at respective angles of inclination, the inclination angle of the center tread elements being greater than the inclination angle of the shoulder tread elements.

20. A tire according to claim 19, wherein the shoulder tread elements each have a ground contacting surface area greater than a ground contacting surface area of the center tread elements.

* * * * *